US011849472B2

(12) United States Patent
Ko et al.

(10) Patent No.: US 11,849,472 B2
(45) Date of Patent: Dec. 19, 2023

(54) WI-FI TRAFFIC AWARE SYSTEM WITH WIRELESS ACCESSORIES

(71) Applicant: Apple Inc., Cupertino, CA (US)

(72) Inventors: Nohee Ko, Mountain View, CA (US); Camille Chen, Cupertino, CA (US); Kenneth Victa, San Jose, CA (US); Sanjay Mani, San Jose, CA (US); Balaji Ravindran, Milpitas, CA (US); Yang Yu, Redwood City, CA (US)

(73) Assignee: Apple Inc., Cupertino, CA (US)

( * ) Notice: Subject to any disclaimer, the term of this patent is extended or adjusted under 35 U.S.C. 154(b) by 209 days.

(21) Appl. No.: 17/319,706

(22) Filed: May 13, 2021

(65) Prior Publication Data

US 2022/0132531 A1 Apr. 28, 2022

Related U.S. Application Data

(60) Provisional application No. 63/106,121, filed on Oct. 27, 2020.

(51) Int. Cl.
*H04W 72/52* (2023.01)
*H04W 28/08* (2023.01)
(Continued)

(52) U.S. Cl.
CPC .......... *H04W 72/52* (2023.01); *H04W 24/08* (2013.01); *H04W 28/0278* (2013.01);
(Continued)

(58) Field of Classification Search
CPC . H04W 24/08; H04W 28/0278; H04W 28/06; H04W 28/0975; H04W 72/1215;
(Continued)

(56) References Cited

U.S. PATENT DOCUMENTS 9,001,682 B2 4/2015 Kovvali
9,491,632 B2 11/2016 Sadek
9,775,048 B2 9/2017 Reddy et al.

FOREIGN PATENT DOCUMENTS

WO WO-2022030733 A1 * 2/2022

* cited by examiner

*Primary Examiner* — Khoa Huynh
(74) *Attorney, Agent, or Firm* — Kowert, Hood, Munyon, Rankin & Goetzel, P.C.

(57) ABSTRACT

Methods and apparatuses are presented to facilitate coexistence between multiple wireless communication protocols implemented by a wireless communication device, by dynamically adjusting priority between the two protocols. The wireless communication device may typically favor a first protocol (e.g. Bluetooth/BTLE), prioritizing resource requests by the first protocol. In certain use cases, the first protocol may demand high resource usage for an extended time, particularly for newer tracking and wearable devices, such as location tags, watches, headsets, etc. Such applications can disrupt existing use cases for a second protocol (e.g., Wi-Fi). Therefore, the wireless communication device may dynamically determine whether the second protocol is performing critical operations, such as latency-sensitive applications or high-performance operations. If so, the wireless communication device may allocate resources accordingly in real time, e.g., by reducing or limiting the resources assigned to the first protocol, to allow increased resources for the second protocol.

20 Claims, 4 Drawing Sheets

(51) Int. Cl.
  *H04W 28/06* (2009.01)
  *H04W 28/02* (2009.01)
  *H04W 24/08* (2009.01)
  *H04W 72/542* (2023.01)
  *H04W 72/566* (2023.01)
  *H04W 84/12* (2009.01)

(52) U.S. Cl.
  CPC ....... *H04W 28/06* (2013.01); *H04W 28/0975* (2020.05); *H04W 72/542* (2023.01); *H04W 72/569* (2023.01); *H04W 84/12* (2013.01)

(58) Field of Classification Search
  CPC . H04W 72/52; H04W 72/542; H04W 72/569; H04W 84/12; H04W 88/06
  See application file for complete search history.

WI-FI TRAFFIC AWARE SYSTEM WITH WIRELESS ACCESSORIES

PRIORITY INFORMATION

This application claims priority to U.S. provisional patent application Ser. No. 63/106,121, entitled "Wi-Fi Traffic Aware System with Wireless Accessories," filed Oct. 27, 2020, which is hereby incorporated by reference in its entirety as though fully and completely set forth herein. The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

TECHNICAL FIELD

The present application relates to wireless communication, including to techniques for coexistence of multiple radio access technologies by sharing usage information.

DESCRIPTION OF THE RELATED ART

Wireless communication systems are rapidly growing in usage. Further, wireless communication technology has evolved from voice-only communications to also include the transmission of data, such as Internet and multimedia content, precise ranging and location, etc.

Additionally, there exist numerous different wireless communication technologies (also referred to as radio access technologies (RATs)) and standards. Some examples of wireless communication standards include GSM, UMTS (associated with, for example, WCDMA or TD-SCDMA air interfaces), LTE, LTE Advanced (LTE-A), NR, HSPA, 3GPP2 CDMA2000 (e.g., 1×RTT, 1×EV-DO, HRPD, eHRPD), IEEE 802.11 (WLAN or Wi-Fi™), BLUETOOTH™, BTLE, ultra wideband (UWB), etc. In some implementations, multiple wireless communication technologies may share certain resources, such as an antenna, frequency space, etc. This may lead to interference and/or conflicts in timing. Improvements in the field are desired.

SUMMARY

Embodiments are presented herein of, inter alia, systems, apparatuses, and methods for performing techniques for coexistence of multiple radio access technologies (RATs) with shared resources for wireless communication, such as a shared antenna, a shared frequency range, etc. According to the techniques described herein, a wireless communication device may utilize communication protocols according to multiple RATs utilizing the shared resources, in a manner that reduces or avoids interference and/or collisions.

A wireless communication device is disclosed, including a first radio configured to communicate via a first radio access technology (RAT); a second radio configured to communicate via a second, different RAT; and an application processor. The application processor may determine whether a latency-sensitive application is presently performing a latency-sensitive communication via the first radio; and at least partly in response to determining that the latency-sensitive application is presently performing a latency-sensitive communication via the first radio, communicate to the second radio that the first radio is in a critical state. The second radio may be configured to reduce communication resource usage in response to receiving communication that the first radio is in the critical state.

In some scenarios, reducing communication resource usage may include decreasing a scan window used for the second RAT.

In some scenarios, reducing communication resource usage may include increasing a scan interval used for the second RAT.

In some scenarios, the application processor may be further configured to determine whether traffic communicated via the first radio is periodic, wherein communicating to the second radio that the first radio is in a critical state is further in response to determining that traffic communicated via the first radio is periodic.

In some scenarios, the application processor may be further configured to determine whether traffic communicated via the first radio meets a threshold quantity, wherein communicating to the second radio that the first radio is in a critical state is further in response to determining that traffic communicated via the first radio meets a threshold quantity.

In some scenarios, the application processor may be further configured to, at least partly in response to determining that the latency-sensitive application is not presently performing a latency-sensitive communication via the first radio, cause the first radio to yield communication resources to the second radio.

In some scenarios, the application processor may be further configured to detect at least one of a transmit buffer overflow or a receive buffer overflow associated with the first radio, wherein communicating to the second radio that the first radio is in a critical state is further in response to detecting the at least one of the transmit buffer overflow or the receive buffer overflow associated with the first radio.

An apparatus is disclosed, which may be included in a wireless communication device. The apparatus may include a memory medium storing software instructions; and processing circuitry configured to execute the software instructions. Execution of the software instructions may cause the processing circuitry to determine whether a first radio of the wireless communication device is in a critical state based on current communication traffic of the first radio; and, in response to determining that the first radio is in the critical state, cause a second radio of the wireless communication device to perform at least one of: reducing a duration of a scan window or increasing a duration of a scan interval, wherein the second radio is configured to scan for advertising packets during the scan window, but not during a remainder of the scan interval.

In some scenarios, determining that the first radio is in the critical state may include determining that the wireless communication device is presently operating a latency-sensitive application in a foreground state.

In some scenarios, determining that the first radio is in the critical state may include determining that the first radio is presently performing a wireless communication in support of a latency-sensitive application.

In some scenarios, determining that the first radio is in the critical state may include determining that traffic communicated via the first radio is periodic.

In some scenarios, determining that the first radio is in the critical state may include determining that traffic communicated via the first radio meets a threshold quantity.

In some scenarios, determining that the first radio is in the critical state may include detecting at least one of a transmit buffer overflow or a receive buffer overflow associated with the first radio.

In some scenarios, executing the software instructions may further cause the processing circuitry to, in response to determining that the first radio is not in the critical state, cause the first radio to yield communication resources to the second radio.

In some scenarios, executing the software instructions may further cause the processing circuitry to repeat the determining whether the first radio is in the critical state on a periodic basis.

Methods and computer-readable media are also disclosed for implementing such apparatuses.

This summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terminology

The following are definitions of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™ Play Station Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Wireless Device—any of various types of computer system devices which performs wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station—The term "Base Station" (also called "eNB" or "gNB") has the full breadth of its ordinary meaning, and at least includes a wireless communication station installed at a fixed location and used to communicate as part of a wireless cellular communication system.

Link Budget Limited—includes the full breadth of its ordinary meaning, and at least includes a characteristic of a wireless device (e.g., a UE) which exhibits limited communication capabilities, or limited power, relative to a device that is not link budget limited, or relative to devices for which a radio access technology (RAT) standard has been developed. A wireless device that is link budget limited may experience relatively limited reception and/or transmission capabilities, which may be due to one or more factors such as device design, device size, battery size, antenna size or design, transmit power, receive power, current transmission medium conditions, and/or other factors. Such devices may be referred to herein as "link budget limited" (or "link budget constrained") devices. A device may be inherently link budget limited due to its size, battery power, and/or transmit/receive power. For example, a smart watch that is communicating over LTE or LTE-A with a base station may be inherently link budget limited due to its reduced transmit/receive power and/or reduced antenna. Wearable devices, such as smart watches, are generally link budget limited devices. Alternatively, a device may not be inherently link budget limited, e.g., may have sufficient size, battery power, and/or transmit/receive power for normal communications over LTE or LTE-A, but may be temporarily link budget limited due to current communication conditions, e.g., a smart phone being at the edge of a cell, etc. It is noted that the term "link budget limited" includes or encompasses power limitations, and thus a power limited device may be considered a link budget limited device.

Processing Element (or Processor)—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Wi-Fi—The term "Wi-Fi" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

Automatically—refers to an action or operation performed by a computer system (e.g., software executed by the computer system) or device (e.g., circuitry, programmable hardware elements, ASICs, etc.), without user input directly specifying or performing the action or operation. Thus, the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Figure 1:
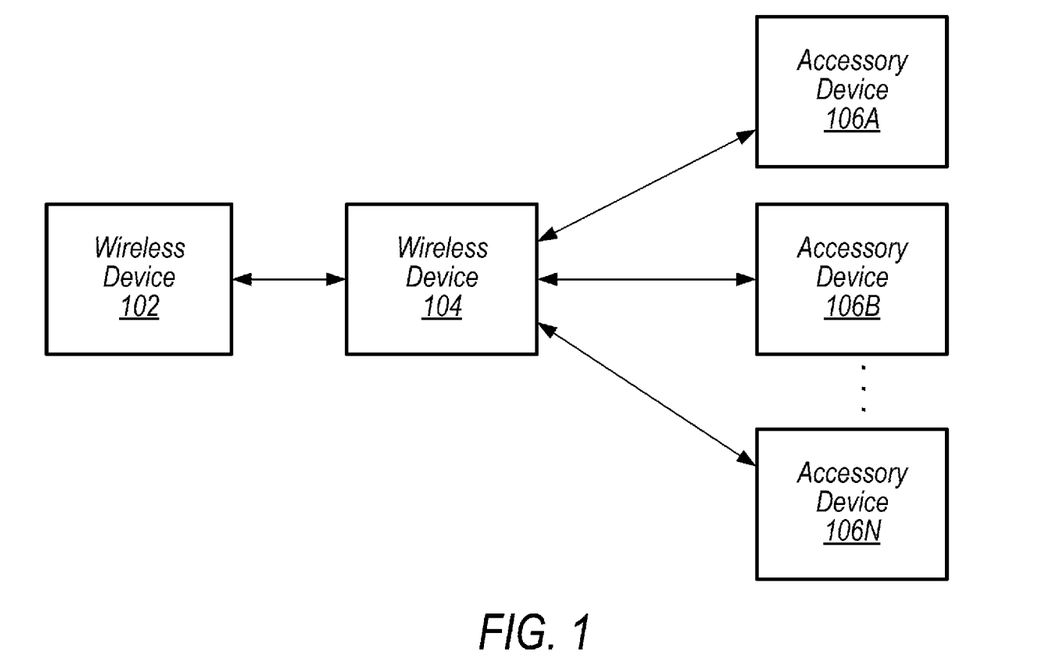
FIG. 1 illustrates an example wireless communication system, according to various exemplary embodiments described herein.

FIG. 1—Wireless Communication System

FIG. 1 illustrates an exemplary (and simplified) wireless communication system 100 in which aspects of this disclosure may be implemented. It is noted that the system of FIG. 1 is merely one example of a possible system, and embodiments of this disclosure may be implemented in any of various systems, as desired.

As shown, the exemplary wireless communication system includes a ("first") wireless device 102 in communication with another ("second") wireless device 104. The first wireless device 102 and the second wireless device 104 may communicate wirelessly using any of a variety of wireless communication techniques.

As shown the exemplary wireless communication system also includes a plurality of accessory devices 106A-N. The accessory devices 106A-N may communicate wirelessly with the wireless device 104 using an of a variety of wireless communication techniques. In some implementations, one or more of the accessory devices 106A-N may additionally communicate wirelessly with the wireless device 102 and/or with each other.

As one possibility, the first wireless device 102 and the second wireless device 104 may communicate using techniques based on WPAN or WLAN wireless communication, such as 802.11/Wi-Fi. One or both of the wireless device 102 and the wireless device 104 may also be capable of communicating via one or more additional wireless communication protocols, such as Bluetooth (BT), Bluetooth Low Energy (BTLE or BLE), ultra wideband (UWB), near field communication (NFC), GSM, UMTS (WCDMA, TDSCDMA), LTE, LTE-Advanced (LTE-A), NR, 3GPP2 CDMA2000 (e.g., 1×RTT, 1×EV-DO, HRPD, eHRPD), Wi-MAX, GPS, etc.

As one possibility, the accessory devices 106A-N may communicate with the wireless device 104 using BTLE. One or more of the accessory devices 106A-N may also be capable of communicating via one or more additional wireless communication protocols, such as those listed above. In some implementations, one or more of the accessory devices 106A-N may utilize only short and/or medium-range RATs, or only low-power RATs; e.g., one or more of the accessory devices 106A-N may not be capable of communicating via cellular RATs.

The wireless devices 102, 104 may be any of a variety of types of wireless device. As one possibility, one or more of the wireless devices 102, 104 may be a substantially portable wireless user equipment (UE) device, such as a smart phone, hand-held device, a wearable device, a tablet, a motor vehicle, or virtually any type of mobile wireless device. As another possibility, one or more of the wireless devices 102, 104 may be a substantially stationary device, such as a set top box, media player (e.g., an audio or audiovisual device), gaming console, desktop computer, appliance, door, base station, access point, or any of a variety of other types of device.

The accessory devices 106A-N may be any of a variety of types of accessory devices, such as wearable devices, home automation devices, vehicles, music players, audio speakers or headsets, wireless pencils, geolocational trackers, data storage devices, etc. In some implementations, one or more of the accessory devices may be link budget limited devices.

Each of the wireless devices 102 and 104, and the accessory devices 106A-N may include wireless communication circuitry configured to facilitate the performance of wireless communication, which may include various digital and/or analog radio frequency (RF) components, a processor that is configured to execute program instructions stored in memory, a programmable hardware element such as a field-programmable gate array (FPGA), and/or any of various other components. The wireless device 102, the wireless device 104, and/or one or more of the accessory devices 106A-N may perform any of the method embodiments described herein, or any portion of any of the method embodiments described herein, using any or all of such components.

Each of the wireless devices 102 and 104, and each of the accessory devices 106A-N may include one or more antennas for communicating using one or more wireless communication protocols. In some cases, one or more parts of a receive and/or transmit chain may be shared between multiple wireless communication standards. For example, a device might be configured to communicate using either of Bluetooth or Wi-Fi using partially or entirely shared wireless communication circuitry (e.g., using a shared radio or at least shared radio components). The shared communication circuitry may include a single antenna, or may include multiple antennas (e.g., for MIMO) for performing wireless communications. Alternatively, a device may include separate transmit and/or receive chains (e.g., including separate antennas and other radio components) for each wireless communication protocol with which it is configured to communicate. As a further possibility, a device may include one or more radios or radio components which are shared between multiple wireless communication protocols, and one or more radios or radio components which are used exclusively by a single wireless communication protocol. For example, a device might include a shared radio for communicating using either of LTE or 5G NR, and separate radios for communicating using each of UWB, Wi-Fi, and/or Bluetooth. Other configurations are also possible.

As previously noted, aspects of this disclosure may be implemented in conjunction with the wireless communication system of FIG. 1. For example, the wireless devices 102 and/or 104, and/or one or more of the accessory devices 106A-N may communicate using one or more coexistence techniques or features described subsequently herein with respect to FIGS. 4-5. By utilizing such techniques (and/or other techniques described herein), the wireless device(s) and/or accessory device(s) may (at least according to some embodiments) be able to reduce interference and/or congestion, while communicating according to a plurality of wireless communication technologies.

Figure 2:
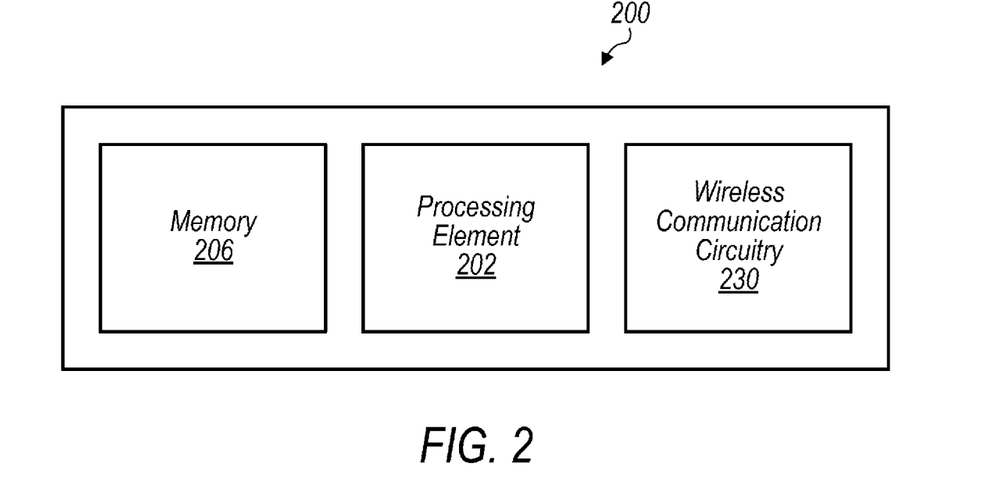
FIGS. 2-3 are block diagrams illustrating example wireless devices, according to various exemplary embodiments described herein.
Figure 3:
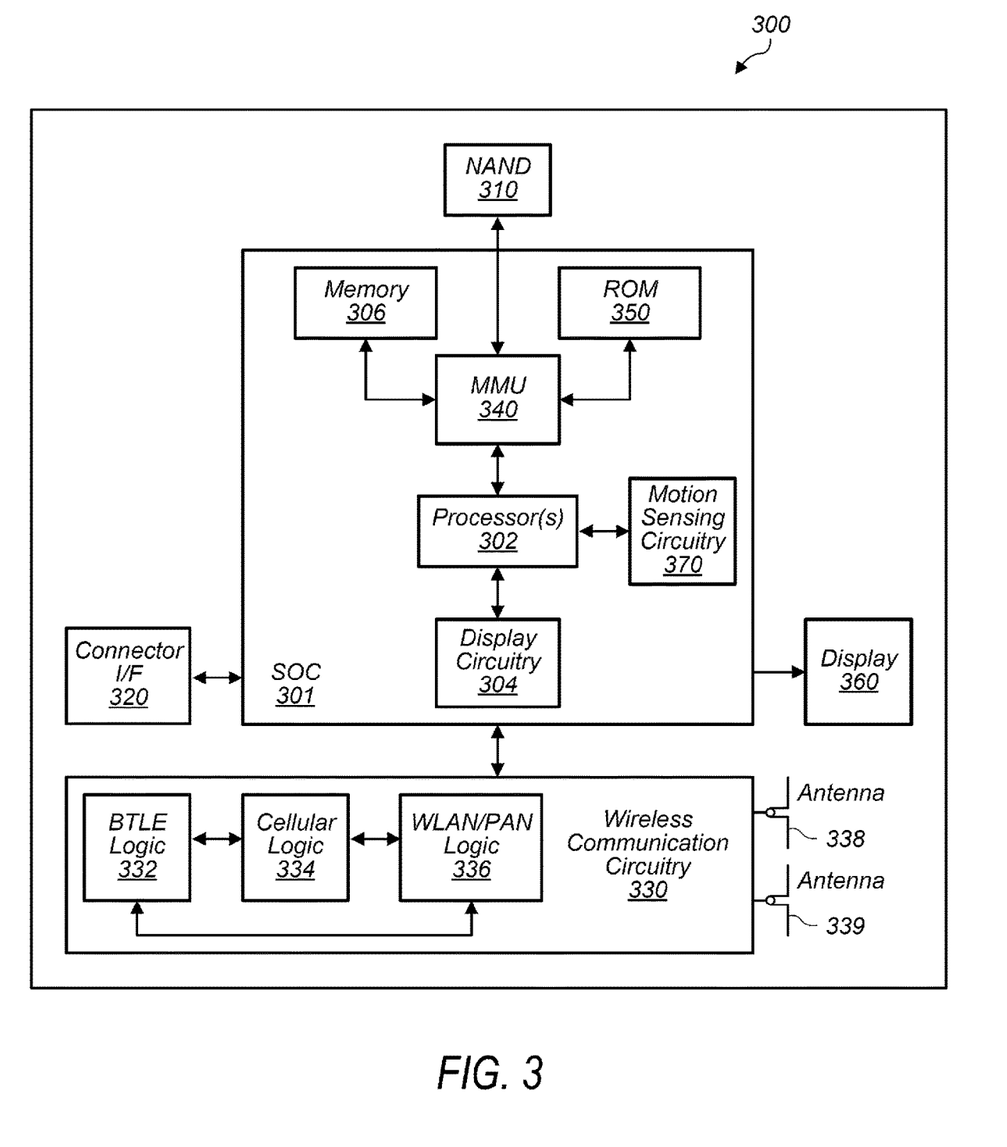

FIGS. 2-3—Exemplary Device Block Diagrams

FIG. 2 illustrates an exemplary wireless device 200 that may be configured for use in conjunction with various aspects of the present disclosure. For example, the device 200 may be an example of the wireless device 102, the wireless device 104, or an accessory device 106 (e.g., one of the accessory devices 106A-N). The device 200 may be any of a variety of types of device and may be configured to perform any of a variety of types of functionality. The device 200 may be a substantially portable device or may be a substantially stationary device, potentially including any of a variety of types of device. The device 200 may be configured to perform one or more wireless communication coexistence techniques or features, such as any of the techniques or features illustrated and/or described subsequently herein with respect to any or all of FIGS. 4-5.

As shown, the device 200 may include a processing element 202. The processing element may include or be coupled to one or more memory elements. For example, the device 200 may include one or more memory media (e.g., memory 206), which may include any of a variety of types of memory and may serve any of a variety of functions. For example, memory 206 could be RAM serving as a system memory for processing element 202. Other types and functions are also possible.

Additionally, the device 200 may include wireless communication circuitry 230. The wireless communication circuitry may include any of a variety of communication elements (e.g., antenna for wireless communication, analog and/or digital communication circuitry/controllers, etc.) and may enable the device to wirelessly communicate using one or more wireless communication protocols.

Note that in some cases, the wireless communication circuitry 230 may include its own processing element (e.g., a baseband processor and/or control processor), e.g., in addition to the processing element 202. For example, the processing element 202 might be (or include) an 'application processor' whose primary function may be to support application layer operations in the device 200, while the wireless communication circuitry 230 might include a 'baseband processor' whose primary function may be to support baseband layer operations (e.g., to facilitate wireless communication between the device 200 and other devices) in the device 200. In other words, in some cases the device 200 may include multiple processing elements (e.g., may be a multi-processor device). Other configurations (e.g., instead of or in addition to an application processor/baseband processor configuration) utilizing a multi-processor architecture are also possible.

The device 200 may additionally include any of a variety of other components (not shown) for implementing device functionality, depending on the intended functionality of the device 200, which may include further processing and/or memory elements (e.g., audio processing circuitry), one or more power supply elements (which may rely on battery power and/or an external power source), user interface elements (e.g., display, speaker, microphone, camera, keyboard, mouse, touchscreen, etc.), sensors, and/or any of various other components.

The components of the device 200, such as processing element 202, memory 206, and wireless communication circuitry 230, may be operatively coupled via one or more interconnection interfaces, which may include any of a variety of types of interface, possibly including a combination of multiple types of interface. As one example, a USB high-speed inter-chip (HSIC) interface may be provided for inter-chip communications between processing elements. Alternatively (or in addition), a universal asynchronous receiver transmitter (UART) interface, a serial peripheral interface (SPI), inter-integrated circuit (I2C), system management bus (SMBus), and/or any of a variety of other communication interfaces may be used for communications between various device components. Other types of interfaces (e.g., intra-chip interfaces for communication within processing element 202, peripheral interfaces for communication with peripheral components within or external to device 200, etc.) may also be provided as part of device 200.

FIG. 3 illustrates one possible block diagram of a wireless device 300, which may be one possible exemplary implementation of the device 200 illustrated in FIG. 2. As shown, the wireless device 300 may include a system on chip (SOC) 301, which may include portions for various purposes. For example, as shown, the SOC 301 may include processor(s) 302 which may execute program instructions for the wireless device 300, and display circuitry 304 which may perform graphics processing and provide display signals to the display 360. The SOC 301 may also include motion sensing circuitry 370 which may detect motion of the wireless device 300, for example using a gyroscope, accelerometer, and/or any of various other motion sensing components. The processor(s) 302 may also be coupled to memory management unit (MMU) 340, which may be configured to receive addresses from the processor(s) 302 and translate those addresses to locations in memory (e.g., memory 306, read only memory (ROM) 350, flash memory 310). The MMU 340 may be configured to perform memory protection and page table translation or set up. In some embodiments, the MMU 340 may be included as a portion of the processor(s) 302.

As shown, the SOC 301 may be coupled to various other circuits of the wireless device 300. For example, the wireless device 300 may include various types of memory (e.g., including NAND flash 310), a connector interface 320 (e.g., for coupling to a computer system, dock, charging station, etc.), the display 360, and wireless communication circuitry 330 (e.g., for UWB, LTE, LTE-A, CDMA2000, Bluetooth, Wi-Fi, NFC, GPS, etc.).

The wireless device 300 may include at least one antenna, and in some embodiments multiple antennas 338 and 339, for performing wireless communication with base stations and/or other devices. For example, the wireless device 300 may use antennas 338 and 339 to perform the wireless communication. In some implementations, each of the antennas 338 or 339 may include one or more antennas and/or one or more antenna arrays. As noted above, the wireless device 300 may in some embodiments be configured to communicate wirelessly using a plurality of wireless communication standards or radio access technologies (RATs).

The wireless communication circuitry 330 may include BTLE Logic 332, Cellular Logic 334, and additional WLAN/PAN Logic 336. The BTLE Logic 332 is for enabling the wireless device 300 to perform BTLE communications (and in some implementations, BT communications, generally), e.g., for wireless communications as described herein. The WLAN/PAN Logic 336 is for enabling the wireless device 300 to perform other WLAN and/or PAN communications, such as Wi-Fi communications. In some scenarios, the WLAN/PAN Logic 336 main include distinct circuitry for performing communications according to distinct protocols, such as a first portion of circuitry for performing Wi-Fi communications and a second portion of circuitry for performing communications according to another RAT. In some scenarios, the WLAN/PAN Logic 336 may also, or alternatively, include shared circuitry for performing communications according to multiple protocols, such as both Wi-Fi and another RAT. In some scenarios, the BTLE logic 332 and the WLAN/PAN logic 336 may share circuitry, e.g., circuitry used in performing communications according to both BTLE and Wi-Fi. The Cellular Logic 334 may be capable of performing cellular communication according to one or more cellular communication technologies. In some scenarios, each of the BTLE Logic 332, the Cellular Logic 334, and the WLAN/PAN Logic 336, or some portion thereof may be referred to as a radio. For example, the BTLE Logic 332 may be referred to as, or may include, a BTLE radio; the Cellular Logic 334 may be referred to as, or may include, a cellular radio; and/or the WLAN/PAN Logic 336 may be referred to as, or may include, one or more of a WLAN radio, a PAN radio, a Wi-Fi radio, etc.

Note that in some cases, one or more of the BTLE Logic 332, the Cellular Logic 334, or the WLAN/PAN Logic 336 may include its own processing element (e.g., a baseband processor and/or control processor), e.g., in addition to the processor(s) 302. For example, the processor(s) 302 might be (or include) an 'application processor' whose primary function may be to support application layer operations in the device 300, while one or more of the BTLE Logic 332, the Cellular Logic 334, or the WLAN/PAN Logic 336 may include a 'baseband processor' whose primary function may be to support baseband layer operations for the applicable RAT.

As described herein, wireless device 300 may include hardware and software components for implementing embodiments of this disclosure. For example, one or more components of the wireless communication circuitry 330 (e.g., BTLE Logic 332 and/or WLAN/PAN Logic 336) of the wireless device 300 may be configured to implement part or all of the methods described herein, e.g., by a processor executing program instructions stored on a memory medium (e.g., a non-transitory computer-readable memory medium), a processor configured as an FPGA (Field Programmable Gate Array), and/or using dedicated hardware components, which may include an ASIC (Application Specific Integrated Circuit).

Figure 4:
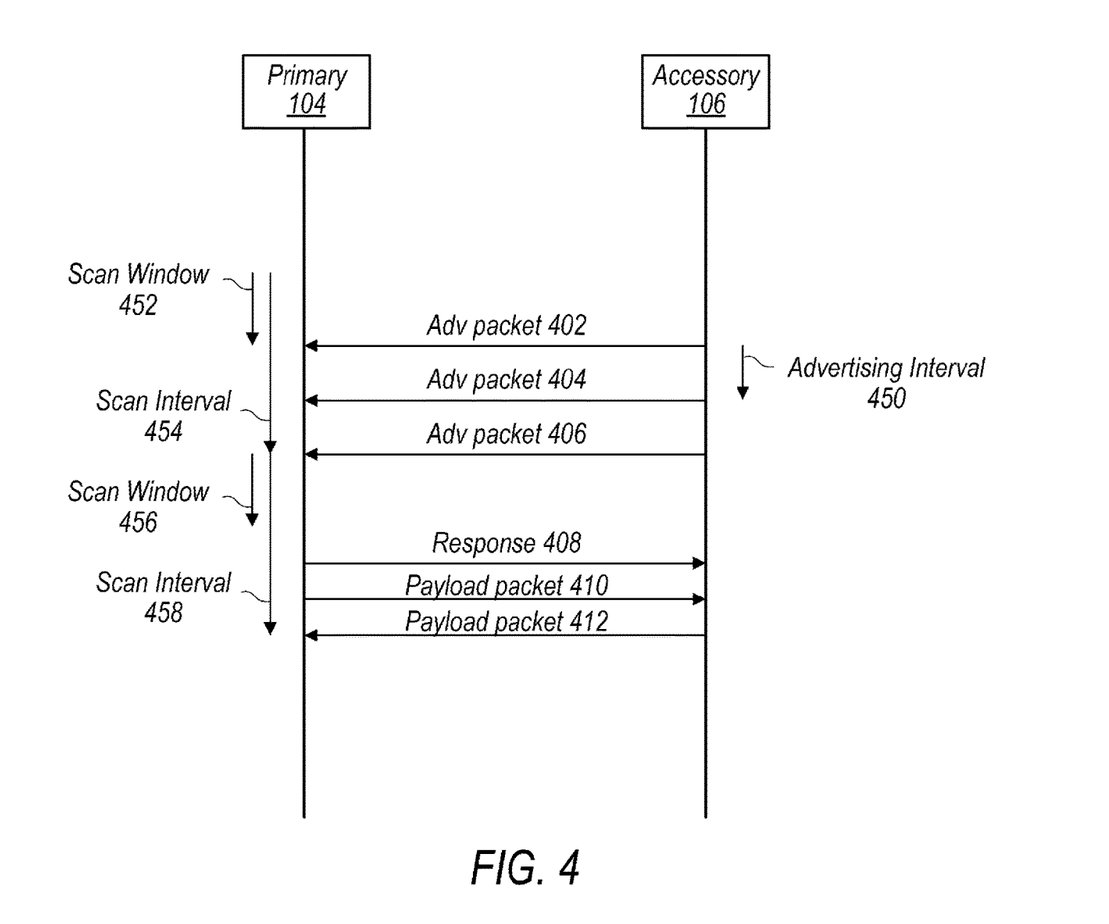
FIG. 4 illustrates a general example of a typical BTLE connection procedure, according to some embodiments.

FIG. 4—Coexistence Considerations

Wireless accessory devices are continuing to increase in popularity, expanding from classic BT human interface devices (HIDs), such as a keyboards, mice, trackpads, game controllers, and headsets for voice or music streaming, to more recent developments, such as a smart watches or other wearable devices, remote controllers, wireless pencils, health/medical devices, home automation devices, wireless chargers, geolocational trackers, etc. The accessory devices 106A-N may be examples of such devices. Such accessory devices may commonly connect via BT (e.g., BTLE), or similar short/medium range RAT, to a primary device, such as the wireless device 104.

If the primary device is also utilizing communications according to one or more other RATs, such as Wi-Fi, scheduling conflicts may arise, e.g., between the Wi-Fi radio and the BTLE radio. For example, BTLE communications may utilize frequency ranges close to or overlapping with (or experiencing harmonics or other noise from) those used by Wi-Fi, which may lead to interference and congestion of the communication medium. For example, Wi-Fi communications frequently utilize the 2.4 GHz band, which may also be used by BTLE. Additionally, BTLE may soon expand into the 5 GHz band used by Wi-Fi, as BTLE devices become more common, and congestion increases on existing bands. This proximity of frequency may also lead to wireless device designs in which a BTLE radio may share one or more antennas with a Wi-Fi radio. In some scenarios, other RATs, such as UWB and/or various cellular communication modes, such as LTE in Unlicensed spectrum (LTE-U) Licensed Assisted Access (LAA), and NR-U, may also operate within the shared frequency range and/or share an antenna with Wi-Fi and/or BTLE radios.

As a specific example of a scheduling conflict, if the BTLE radio initiates a connection establishment procedure that demands use of 100% of the airtime while the Wi-Fi radio is receiving a real-time audio/video stream (such as a podcast, VOIP call, video conference, etc.), the Wi-Fi radio may be denied access to the communication channel and/or shared antenna(s) during the BTLE connection establishment procedure, which may result in a stall or interruption in the Wi-Fi data, resulting in a poor user experience.

Traditionally, coexistence schemes between Wi-Fi and BT (including BTLE) dictate rigid Wi-Fi and BT packet arbitration, such as time-division duplex (TDD) (e.g., hybrid or parallel). Such schemes are based on certain assumptions, such as BT devices having strict, but predictable schedules, and a high demand for BT packet protection—e.g., because BT use cases have traditionally been highly visible to the user, resulting in poor user experience if packets are dropped or delayed. Another traditional assumption has been that BT accessory use will be relatively limited in duration. Another traditional assumption has been that Wi-Fi has less-time-critical requirements, as Wi-Fi applicants have traditionally been more data-driven, and thus forgiving of delays. Another traditional assumption has been that coexistence solutions should follow system constraints, such as shared antennas, antenna isolation requirements, and antenna performance requirements.

However, recently developed and developing use cases, such as wearable devices, sensors, geolocation trackers, etc., upset these assumptions. For example, some such accessory devices are designed to be worn or carried throughout the day, which, according to the traditional coexistence schemes outlined above, may result in frequent monopolization of resources by the BT radio throughout the day. Additionally, Wi-Fi use cases are increasingly including low-latency applications, such as streaming audio/video.

Each wireless accessory may have individual requirements to connect with the primary device. For example, a classic BT HID may be configured to use a sniff mode to establish a connection with a primary device. Once the BT HID is in an active state, it may communicate with the primary device at regular, e.g., frequent, intervals. For example, the BT HID may use a 15 ms interval to communicate with the primary device. While the BT HID is in an idle or sleep state, it may forego communication for hundreds of milliseconds, e.g., to save power. During these windows, the primary device may relax (e.g., increase) the sniff interval. If the primary device is also utilizing one or more other radios, such as a Wi-Fi radio, then the primary device can predict when the BT radio will request access to reception resources, as the sniff mode is predictably scheduled. This may allow the primary device to utilize both BT and Wi-Fi efficiently; e.g., without significant resource scheduling conflicts.

However, when paired with BTLE based accessory devices, the primary device may connect with the accessory devices less predictably. For example, some BTLE accessory devices may be designed to dynamically leave/enter communication range. As another example, some BTLE accessory devices may operate with low transmission power and/or near the edge of communication range, such that a transmission may not be properly received. However, an intended user experience may dictate that the primary device should resume communication with such devices immediately when the accessory device reenters communication range. For example, a user may return home with a primary device (e.g., a smart phone), and may expect that home automation accessory devices (e.g., a smart door lock, a smart thermostat, etc.) connect with the primary device immediately, so as to quickly accommodate the user's presence. As another example, a geolocational tracker may be designed to establish a connection infrequently, such as every 15 minutes, to conserve power. However, effective use of the geolocational tracker may dictate that the primary device reliably connect with the tracker at those times, e.g., to establish the location of the tracker. In these scenarios, traditional techniques may dictate that the BTLE radio listen frequently, or continuously, to establish a connection with BTLE accessory devices.

FIG. 4 illustrates a general example of a typical BTLE connection procedure, according to some embodiments. As illustrated, an accessory device, such as the accessory device 106, may periodically transmit one or more advertising packets, such as the advertising packets 402, 404, and 406. Such packets may be directed or undirected, or may be connectable advertising packets. In some scenarios, such advertising packets may be transmitted at an advertising interval 450, which may range in length, e.g., from 20 ms to 10.24 seconds, or other lengths. In an example scenario, the accessory device may typically transmit with an advertising interval of 181.25 ms, but may transition to an advertising interval of 20 ms when a fast connection is desired.

As illustrated, a primary device, such as the primary device 104, may periodically scan for any transmitted advertising packets. For example, the primary device may scan during a scan window, such as scan windows 452 and 456, then forego scanning for the remaining portion of a scan interval, such as scan intervals 454 and 458. In some scenarios, the scan window and the scan interval may continue to repeat. In an example case, the scan window may be 30 ms, and the scan interval may be set to a value within a range of 30 ms to 300 ms. For example, when a fast connection is desired, the scan interval may be set to 40 ms.

In some scenarios, the accessory device may potentially transmit advertising packets according to multiple advertising intervals before a transmission falls within a scan window of the primary device. For example, as illustrated in FIG. 4, advertising packet 402 and advertising packet 404 are transmitted within scan interval 454, after scan window 452 has concluded. Thus, the primary device 104 does not detect these packets. Advertising packet 406 is transmitted within scan window 456, and is therefore detected by the primary device 104.

In other scenarios, if the advertising interval is larger than the scan window, multiple scan intervals may potentially pass before an advertising packet transmission falls within a scan window. Additionally, even if the accessory device transmits an advertising packet during a scan window of the primary device, there is a chance that the primary device may fail to receive the advertising packet, e.g., due to low reception power, interference, etc., which may result in further delay of one or more additional scan intervals before a subsequent advertising packet is received.

As illustrated in FIG. 4, in response to receiving an advertising packet (e.g., advertising packet 406), the primary device 104 may transmit a response 408, such as a connect indication signal, which may include various connection settings and/or configuration parameters, such as offset, connection interval, channel map, hop interval, etc. The primary device 104 and the accessory device 106 may then exchange BTLE payload communication packets, such as payload packet 410 and payload packet 412.

Table 1 illustrates a typical time delay (in ms) to achieve a 95% success rate for a primary device operating with specified scan parameters to discover an accessory device that is transmitting at a specified advertising interval. Specifically, the first column indicates the advertising interval, while the first row specifies the scan window and the scan interval, respectively.

TABLE 1

| Adv Int | 30/30 ms | 30/60 ms | 150/300 ms | 30/300 ms | 30/966 ms |
|---|---|---|---|---|---|
| 20 | 25 | 60 | 161 | 283 | 921 |
| 25 | 30 | 66 | 166 | 317 | 1031 |
| 30 | 34 | 89 | 172 | 519 | 1739 |
| 35 | 39 | 109 | 179 | 566 | 2217 |
| 40 | 44 | 131 | 184 | 762 | 2587 |
| 45 | 48 | 193 | 187 | 2164 | 2759 |
| 50 | 53 | 371 | 200 | 724 | 3119 |
| 181.25 | 179 | 1120 | 491 | 2855 | 9872 |

For example, the second column indicates a scan window of 30 ms and a scan interval of 30 ms. With these settings, the primary device is scanning continuously for the advertising packets, which is likely to result in discovery very quickly. For example, as shown in the second row, if the accessory device transmits with an advertising interval of 20 ms, then the 95% discovery time will be 25 ms. By contrast, if the accessory device transmits with an advertising interval of 181.25 ms, as shown in the tenth row, then the 95% discovery time will be 179 ms.

As another example, the sixth column indicates a scan window of 30 ms and a scan interval of 966 ms, which is likely to result in much slower discovery. For example, as shown in the second row, if the accessory device transmits with an advertising interval of 20 ms, then the 95% discovery time will be 921 ms. By contrast, if the accessory device transmits with an advertising interval of 181.25 ms, as shown in the tenth row, then the 95% discovery time will be nearly 10 seconds.

Figure 5:
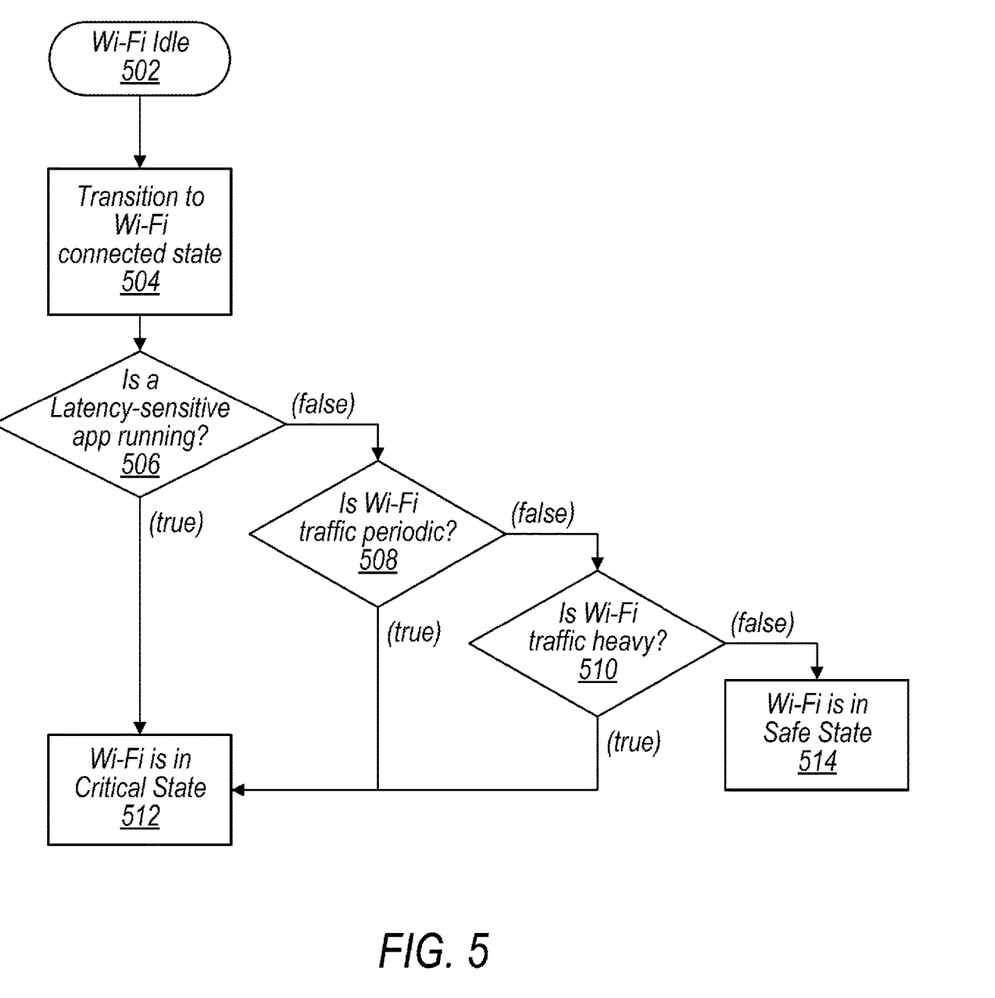
FIG. 5 illustrates an example flow diagram of one method of dynamically assigning priority between a Wi-Fi radio and a BTLE radio, according to some embodiments.

Multiple possible problems may be appreciated from the various available combinations shown in FIG. 5. For example, in some scenarios, the BTLE radio may request 100% of the resources (e.g., the 30/30 ms example) for an extended time, e.g., to achieve a quick connection between the primary device and a home automation device, as in the example discussed above. Traditionally, to fully protect BTLE connections, some system designs may allow the Wi-Fi radio to grant all requested resources to the BTLE radio. If the accessory device is advertising slowly (e.g., once in 1-2 seconds) to save power, and/or if the advertising signal is weak, then the Wi-Fi may be denied resources for an extended time, while the BTLE radio seeks to establish a connection with the accessory device. In particular, the Wi-Fi radio may not be granted resources sufficient even to request protection using PM or CTS2S. This may cause Wi-Fi data to stall, resulting in a poor user experience.

In other systems, this may be avoided by implementing strict time division rules between the radios, such as a 50/50% division, in which 50% of the resources are reserved for Wi-Fi and 50% are reserved for BTLE. However, this may also lead to inefficiencies, as either the Wi-Fi radio or the BTLE radio may not utilize all of the available resources. Alternatively, one radio may require additional resources, while the other radio may be not communicating, or may be communicating non-critical data that could be delayed without significant impact to the user experience.

FIG. 5—Resource Sharing Using Traffic Awareness

FIG. 5 illustrates an example flow diagram of one method of dynamically assigning priority between a Wi-Fi radio and a BT radio, according to some embodiments. Specifically, according to the method of FIG. 5, the Wi-Fi and BT requirements may be monitored to dynamically adjust priority, e.g., in real time. The method of FIG. 5 may be implemented by an apparatus for use by a primary device, such as the wireless device 104 or the wireless device 300. The apparatus may include or consist of the entire primary device, or may include or consist of some component(s) thereof, such as the wireless communication circuitry 330 and/or the processor(s) 302.

As illustrated, at 502, the primary device may begin with its Wi-Fi radio in an idle state. For example, the apparatus may configure the Wi-Fi radio to transition to the idle state, or may determine that the Wi-Fi radio is in the idle state. In the idle state, the Wi-Fi radio may not transmit or receive (or may engage in only limited transmission/reception), and may partially or completely power down at least portions of the Wi-Fi radio.

At 504, the apparatus may transition the Wi-Fi radio to a connected state, e.g., within a frequency band that is also used by BT, such as the 2.4 GHz band. Transitioning the Wi-Fi radio to the connected state may include causing the Wi-Fi radio to power on some or all hardware of the Wi-Fi radio, and/or to establish a connection with one or more remote devices.

At 506, the apparatus may determine whether the primary device is currently running a latency-sensitive application using Wi-Fi communications. Examples of latency-sensitive applications may include video conferencing applications, VoIP call applications, and media streaming applications, among others. In some scenarios, a latency-sensitive application may be one in which a certain amount of data or a certain number of packets, messages, etc., are expected to be communicated within a given time period in order to maintain an acceptable user experience. In response to determining that the primary device is running a latency-sensitive application using Wi-Fi communications, the apparatus may, at 512, treat the Wi-Fi radio as being in a critical state.

In response to determining that the primary device is not running a latency-sensitive application using Wi-Fi communications, the apparatus may, at 508, determine whether Wi-Fi traffic being received or transmitted by the Wi-Fi radio is periodic. For example, the apparatus may sample (or cause to be sampled) Wi-Fi data frames periodically (e.g., every 5 ms), and may extract the frequency of data transactions, e.g., using a FFT. Streaming applications, and other similarly time-critical applications, are often designed to employ periodic data transactions. For example, VoIP applications typically employ data transactions in 20 ms intervals. Therefore, in response to determining that Wi-Fi traffic being received or transmitted by the Wi-Fi radio is periodic, the apparatus may transition to 512, and treat the Wi-Fi radio as being in a critical state.

In response to determining that Wi-Fi traffic being received or transmitted by the Wi-Fi radio is not periodic, the apparatus may, at 510, determine whether Wi-Fi traffic being received or transmitted by the Wi-Fi radio is particularly heavy. For example, the apparatus may sample (or cause to be sampled) the Wi-Fi data usage periodically, (e.g., every 5 seconds), and may determine whether the Wi-Fi traffic meets (or exceeds) a threshold quantity. In evaluating the usage, the apparatus may consider any of various link parameters, such as link latency, signal-to-noise ratio (SNR), received signal strength indicator (RSSI), noise floor, clear channel assessment (CCA), maximum physical transmit/receive rates, number of streams (e.g., antennas in MIMO), available bandwidth (e.g., 20, 40, 80, or 160 MHz), aggregate MAC protocol data unit (AMPDU) buffer size, etc. In response to determining that the Wi-Fi traffic is particularly heavy, the apparatus may transition to 512, and treat the Wi-Fi radio as being in a critical state.

In response to determining that the Wi-Fi traffic is not particularly heavy, the apparatus may, at 514, treat the Wi-Fi radio as being in a safe state. While the apparatus treats the Wi-Fi radio as being in the safe state, the Wi-Fi radio and the BT radio may operate according to standard procedures, such as the traditional procedures outlined above. For example, in the safe state, the Wi-Fi radio may yield resources (e.g., up to 100% of resources) to the BT radio to perform connection establishment or other tasks, as outlined above. As another example, in the safe state, the Wi-Fi radio may utilize resources according to a predetermined strict time division, as outlined above.

While the apparatus treats the Wi-Fi radio as being in the critical state, the apparatus may adjust (e.g., reduce) the resource usage by the BT radio, so as to accommodate increased resource usage by the Wi-Fi radio. For example, an application processor of the primary device (e.g., the processor(s) 302) may instruct (or request, dictate, etc.) the BT radio (e.g., the BTLE logic 332) to adjust its resource usage, e.g., by decreasing its scan window and/or increasing its scan interval. In some scenarios, the application processor may specify parameters (such as the scan window and/or scan interval) for use by the BT radio. As another example, the application processor may notify the BT radio that the Wi-Fi radio is in the critical state and/or that resource use reduction is requested/required, and the BT radio may respond by determining to adjust (e.g., reduce) its resource usage. In some scenarios, the application processor may provide additional data to the BT radio to assist the BT radio in determining an appropriate adjustment to its resource usage. For example, the application processor may provide information regarding the determinations performed at any of steps 506-510, and/or measurement data supporting those determinations.

In some implementations, the amount of reduction of resources used by the BT radio in response to the Wi-Fi radio being treated as being in the critical state may be fixed. In other implementations, the amount of reduction may be variable, e.g., dynamic. For example, the amount of reduction of resources used by the BT radio may be determined (e.g., by the application processor and/or the BT radio) based on various factors, such as (but not limited to) traffic level of the Wi-Fi radio and/or the BT radio, how long the Wi-Fi radio has been in the critical state, and/or current operation being performed by the BT radio.

It should be understood that the method illustrated in FIG. 5 is one example of a possible method for dynamically assigning priority, and many variations are possible. For example, one or more of steps 506-510 may be omitted or executed in a different order. In some implementations, two or more of steps 506-510 may be executed concurrently, e.g., independently of each other, and the apparatus may treat the Wi-Fi radio as being in the critical state if any of the resulting determinations are true. As another example, one or more additional determinations may additionally, or alternatively, be executed.

For example, to determine whether to treat the Wi-Fi radio as being in the critical state, the apparatus may consider the state of BT Tx buffer overflow, BT Rx buffer overflow, Wi-Fi Tx buffer overflow, and/or Wi-Fi Rx buffer overflow. Considering the buffer overflows of the BT radio and/or the Wi-Fi radio may allow the apparatus to adjust resource usage more dynamically. For example, in response to detecting one or more Wi-Fi buffer overflows (or detects a sustained pattern of overflows), the apparatus may treat the Wi-Fi as being in a critical state. Alternatively, or additionally, the apparatus may request that the BT radio further reduce its resource usage, e.g., by further decreasing its scan window and/or further increasing its scan interval. Similarly, in response to detecting one or more BT buffer overflows (or detects a sustained pattern of overflows), the apparatus may treat the Wi-Fi as being in a safe state, to allow more resources to the BT radio. Alternatively, or additionally, the apparatus may instruct/inform the BT radio that it may relax its resource usage reduction measures, e.g., by somewhat increasing its scan window and/or somewhat decreasing its scan interval. Such instructions may allow for greater control of dynamic balancing of resource allocation between the Wi-Fi radio and the BT radio.

As another example, one or more steps may include multiple determinations. For example, if the apparatus determines, at 506, that the primary device is currently running a latency-sensitive application using Wi-Fi communications, then the apparatus may make one or more further determinations before treating the Wi-Fi radio as being in a critical state, so as to provide more fine-grained real-time control over resource allocation between the Wi-Fi radio and the BT radio. For example, the apparatus may determine whether the latency-sensitive application is actively performing a latency-sensitive communication (e.g., whether a video streaming application is actively steaming) via the Wi-Fi radio. If the application is actively performing a latency-sensitive operation, then the apparatus may treat the Wi-Fi radio as being in a critical state (or may perform further determinations), while if the application is not actively performing a latency-sensitive operation, then the apparatus may move on to step 508, as discussed above.

As another example of an additional determination, the apparatus may, at 506, determine whether the latency-sensitive application is in the foreground or the background. If the application is operating in the foreground, then the apparatus may treat the Wi-Fi radio as being in a critical state (or may perform further determinations), while if the application is in the background (or not in the foreground), then the apparatus may move on to step 508, as discussed above.

In various implementations, the apparatus may receive information from one or more sources. For example, the apparatus may receive information from an application processor, the Wi-Fi radio, the BT radio, and/or other source(s). In some implementations, the apparatus may include one or more of these sources, and may therefore generate the applicable information itself.

In some scenarios, some or all of steps 506-514 may be repeated while the Wi-Fi radio remains in the connected state. For example, the steps to determine whether to treat the Wi-Fi radio as being in the critical state or the safe state may be repeated periodically, or may be repeated for each packet or group of packets transmitted or received via the Wi-Fi radio. In this way, the Wi-Fi state may be determined and updated in real time, which may allow for real-time dynamic allocation of resources.

It should be understood that the techniques described above are not limited to the example scenarios of Wi-Fi and BT. For example, in some scenarios, the method of FIG. 5 may be applied to other wireless RATs, such as UWB. Additionally, or alternatively, the method may be applied to other applications of Wi-Fi, such as Wi-Fi in AWDL/NAN. In such scenarios, the determinations may be adapted to include applicable information, such as Apple Wireless Direct Link/Neighbor Awareness Networking (AWDL/NAN) scheduling, chip capabilities such as simultaneous dual band (SDB), AP capability such as 802.11AX, etc.

In addition to the above-described exemplary embodiments, further embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a device (e.g., a wireless device 102 or 104) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A wireless communication device, comprising:
a first radio configured to communicate via a first radio access technology (RAT);
a second radio configured to communicate via a second, different RAT; and
an application processor configured to:
determine whether a latency-sensitive application is presently performing a latency-sensitive communication via the first radio;
detect a buffer overflow of a transmit buffer or a receive buffer associated with the first radio; and
at least partly in response to determining that the latency-sensitive application is presently performing a latency-sensitive communication via the first radio, and further in response to detecting the buffer overflow, communicate to the second radio that the first radio is in a critical state;
wherein the second radio is configured to reduce communication resource usage in response to receiving communication that the first radio is in the critical state.

2. The wireless communication device of claim 1, wherein reducing communication resource usage includes decreasing a scan window used for the second RAT.

3. The wireless communication device of claim 1, wherein reducing communication resource usage includes increasing a scan interval used for the second RAT.

4. The wireless communication device of claim 1, wherein the application processor is further configured to:
determine whether traffic communicated via the first radio is periodic;
wherein communicating to the second radio that the first radio is in a critical state is further in response to determining that traffic communicated via the first radio is periodic.

5. The wireless communication device of claim 4, wherein the first radio is a Wi-Fi radio.

6. The wireless communication device of claim 4, wherein determining whether traffic communicated via the first radio is periodic comprises:
causing traffic communicated via the first radio to be periodically sampled; and
determining a frequency of data transactions of the latency-sensitive application using a Fast-Fourier Transform (FFT).

7. The wireless communication device of claim 1, wherein the application processor is further configured to:
determine whether traffic communicated via the first radio meets a threshold quantity;
wherein communicating to the second radio that the first radio is in a critical state is further in response to determining that traffic communicated via the first radio meets a threshold quantity.

8. The wireless communication device of claim 1, wherein the application processor is further configured to:
at least partly in response to determining that the latency-sensitive application is not presently performing a latency-sensitive communication via the first radio, cause the first radio to yield communication resources to the second radio.

9. A non-transitory computer-readable memory medium storing software instructions executable by a processor of a wireless communication device, wherein, when executed, the software instructions cause the wireless communication device to:

determine whether a latency-sensitive application is presently performing a latency-sensitive communication via a first radio of the wireless communication device;

detect a buffer overflow of a transmit buffer or a receive buffer associated with the first radio; and     at least partly in response to determining that the latency-sensitive application is presently performing a latency-sensitive communication via the first radio, and further in response to detecting the buffer overflow, communicate to a second radio of the wireless communication device that the first radio is in a critical state;

wherein the second radio is configured to reduce communication resource usage in response to receiving communication that the first radio is in the critical state.

10. The non-transitory computer-readable memory medium of claim 9, wherein reducing communication resource usage includes at least one of: decreasing a scan window used for the second radio or increasing a scan interval used for the second radio.

11. The non-transitory computer-readable memory medium of claim 9, wherein the software instructions further cause the wireless communication device to:

determine whether traffic communicated via the first radio is periodic;

wherein communicating to the second radio that the first radio is in a critical state is further in response to determining that traffic communicated via the first radio is periodic.

12. The non-transitory computer-readable memory medium of claim 9, wherein the software instructions further cause the wireless communication device to:

determine whether traffic communicated via the first radio meets a threshold quantity;

wherein communicating to the second radio that the first radio is in a critical state is further in response to determining that traffic communicated via the first radio meets a threshold quantity.

13. A method comprising:

determining whether a latency-sensitive application is presently performing a latency-sensitive communication via a first radio of a wireless communication device;

detecting a buffer overflow of a transmit buffer or a receive buffer associated with the first radio; and     at least partly in response to determining that the latency-sensitive application is presently performing the latency-sensitive communication via the first radio, and further in response to detecting the buffer overflow, communicating to a second radio of the wireless communication device that the first radio is in a critical state;

in response to receiving communication that the first radio is in the critical state, reducing communication resource usage by the second radio.

14. The method of claim 13, wherein reducing communication resource usage includes decreasing a scan window used for the second radio.

15. The method of claim 13, wherein reducing communication resource usage includes increasing a scan interval used for the second radio.

16. The method of claim 13, further comprising:

determining whether traffic communicated via the first radio is periodic;

wherein communicating to the second radio that the first radio is in the critical state is further in response to determining that traffic communicated via the first radio is periodic.

17. The method of claim 16, wherein determining whether traffic communicated via the first radio is periodic comprises:

causing traffic communicated via the first radio to be periodically sampled; and     determining a frequency of data transactions of the latency-sensitive application using a Fast-Fourier Transform (FFT).

18. The method of claim 13, further comprising:

determining whether traffic communicated via the first radio meets a threshold quantity;

wherein communicating to the second radio that the first radio is in the critical state is further in response to determining that traffic communicated via the first radio meets the threshold quantity.

19. The method of claim 13, further comprising:

at least partly in response to determining that the latency-sensitive application is not presently performing a latency-sensitive communication via the first radio, causing the first radio to yield communication resources to the second radio.

20. The method of claim 13, further comprising:

repeating the on a periodic basis the determining whether the latency-sensitive application is presently performing a latency-sensitive communication via the first radio.

\* \* \* \* \*